United States Patent
Shivanna et al.

(10) Patent No.: US 11,601,473 B2
(45) Date of Patent: Mar. 7, 2023

(54) INFORMATION TECHNOLOGY STACK SECURITY CONTROL CONFIGURATION

(71) Applicant: HEWLETT PACKARD ENTERPRISE DEVELOPMENT LP, Houston, TX (US)

(72) Inventors: Suhas Shivanna, Karnataka (IN); Sridhar Bandi, Karnataka (IN); Yelaka Surya Prakash, Karnataka (IN); Shiva R. Dasari, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 210 days.

(21) Appl. No.: 16/860,262

(22) Filed: Apr. 28, 2020

(65) Prior Publication Data

US 2021/0336992 A1   Oct. 28, 2021

(51) Int. Cl.
*H04L 9/40* (2022.01)

(52) U.S. Cl.
CPC ............... *H04L 63/20* (2013.01); *H04L 63/08* (2013.01); *H04L 63/105* (2013.01); *H04L 63/1433* (2013.01); *G06F 2221/2113* (2013.01)

(58) Field of Classification Search
CPC ....... H04L 63/20; H04L 63/08; H04L 63/105; H04L 63/1433; G06F 2221/2113
USPC .......................................................... 726/25
See application file for complete search history.

(56) References Cited

U.S. PATENT DOCUMENTS

| | | | |
|---|---|---|---|
| 8,732,094 B2 | 5/2014 | Rosa et al. | |
| 9,043,861 B2 | 5/2015 | Lang et al. | |
| 9,729,576 B2 | 8/2017 | Lang et al. | |
| 2018/0121658 A1* | 5/2018 | Ross | G06F 21/577 |
| 2019/0363929 A1* | 11/2019 | Andreoli | H04L 67/20 |

FOREIGN PATENT DOCUMENTS

WO   WO-2013019241 A1 *   2/2013   ............. H04L 41/18

OTHER PUBLICATIONS

Chef, Modern Configuration Management: Configuration as Code, Jan. 16, 2020 (4 pages).
Lynis downloaded Apr. 24, 2020 (12 pages).
Muhammad Qaiser Saleem et al., "Model Driven Security Framework for Definition of Security Requirements for SOA Based Applications," Dec. 5, 2010, pp. 266-270, IEEE.
Mukhtiar Memon et al., "Sectissimo: a Platform-Independent Framework for Security Services," Jan. 2008, pp. 1-10, University of Innsbruck, Austria.

(Continued)

*Primary Examiner* — Teshome Hailu
*Assistant Examiner* — Aubrey H Wyszynski
(74) *Attorney, Agent, or Firm* — Trop, Pruner & Hu, P.C.

(57) ABSTRACT

In some examples, a system receives input information relating to a security level for an information technology (IT) stack comprising a plurality of layers including a hardware layer and a software layer, where the input information is technology and product agnostic. The system discovers components of the plurality of layers of the IT stack, accesses a knowledge base that maps the security level and the discovered components to configuration instructions relating to security controls, and configures the IT stack with the security controls using the configuration instructions.

18 Claims, 4 Drawing Sheets

(56) References Cited

OTHER PUBLICATIONS

Wikipedia, Center for Internet Security last edited Jan. 25, 2020 (9 pages).
Wikipedia, NIST Special Publication 800-53 last edited Apr. 12, 2020 (8 pages).
Wikipedia, Security Content Automation Protocol last edited Dec. 22, 2019 (3 pages).

* cited by examiner

INFORMATION TECHNOLOGY STACK SECURITY CONTROL CONFIGURATION

BACKGROUND

An information technology (IT) environment can include various resources that are useable by entities to perform operations. Examples of resources include processing resources (e.g., computers, processors, etc.), storage resources (e.g., memories, persistent storage devices, etc.), communication resources (e.g., networks, network switches or routers, firewalls, etc.), machine-readable instruction resources (e.g., software such as applications and operating systems, firmware such as boot firmware, management instructions such as to perform out-of-band management of devices, etc.), and so forth.

An IT environment may experience errors during operation due to various causes. For example, the IT environment may be subject to attacks either from within or from outside the IT environment. Such attacks can pose threats to the IT environment, since data can be stolen from IT environment, attacks can degrade performance of the IT environment, and so forth.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An information technology (IT) environment can include a data center, a cloud, an enterprise computing environment, or any other environment that includes computing resources (such as processing resources, storage resources, communication resources, program resources, and so forth).

Errors during the operation of an IT environment can result from misconfiguration, inadequate technical control, or operator error. Such misconfiguration, inadequate technical control, or operator error may expose the IT environment to an attack by an attacker, which can include malware, a human hacker, or any other entity, whether inside or outside an enterprise that owns or operates the IT environment. The attacker can compromise a component (or multiple components) within the IT environment, which can cause the environment to become non-operational, exhibit degraded performance, or exhibit another anomalous behavior or incorrect operation.

The components of the IT environment can be arranged as an IT stack (or more simply, a "stack"). An "IT stack" or "stack" can refer to a collection of layers including any or some combination of the following: a physical (hardware) layer, a firmware layer, and a software layer. The software layer can include an operating system (OS), a hypervisor, a container or another type of firmware entity, an application, and so forth. The firmware layer can include firmware (in the form of machine-readable instructions) such as boot code, Unified Extensible Firmware Interface (UEFI) code, firmware for hardware components, and so forth. The hardware later includes hardware components such as a processor, a storage device, a communication device (e.g., a router, a switch, a gateway, etc.), or another type of electronic device.

A large IT environment can include a large number of components in the IT stack, which can be associated with a large number of security parameters across different products and technologies and described in multiple documents that relate to the products and technologies. A "security parameter" can refer to a parameter that governs security associated with a given component or group of components. In some cases, a human IT administrator (or group of IT administrators) has to manually identify all the relevant security parameters and then configure security controls associated with a complex IT stack based on the associated risks of the IT stack or workload to be executed by the IT stack.

A security control can be used to manage a security setting of a component or a group of components. A "security setting" of a component or a group of components in an IT stack refers to a configuration or another aspect associated with the component or group of components allows the component or group of components to ensure or increase the likelihood of secure operation such that data breaches, erroneous operation, unauthorized access of resources, or any other unauthorized activity or behavior is not or is less likely to be experienced by the components or group of components.

In some cases, the components of an IT stack are to comply with various requirements, which may be specified by industry standards, by an enterprise, by users, and so forth. There may be conflicting compliance requirements across components in the different layers of the IT stack. Having to resolve a conflict in compliance requirements can add to the burden of the IT administrator (or group of IT administrators). As a result, it is likely that sub-optimal security controls are defined for the various components of the IT stack, which can subject the IT environment to erroneous operation.

A baseline is a set of security controls that provides an appropriate level of security for the IT stack. Coming up with an appropriate security baseline is challenging if the IT stack, which is made up of multiple layers each with multiple components, is complex. Standards or guidelines may specify recommendations for security controls to be used for IT stacks. However, such recommendations are not tailored to specific IT stacks and the anticipated threat landscape (that includes threats that the IT stacks are currently experiencing or expected to experience). As a result, the recommended security controls may not optimally specify security controls to be used for any given IT stack and customer specific risk management policies. Even with the recommendations, a human IT administrator (or group of IT administrators) may have to perform deep analysis (which may involve specific expertise) to determine what security controls are to be employed to satisfy various security goals. An improperly configured IT stack that is not aligned with business requirements can result in non-optimal security, and lower performance, usability and business agility Moreover, recommended security controls from standards or guidelines may not cover at a granular level specific security controls that can be dependent upon a platform or technology that is used by an IT environment.

In accordance with some implementations of the present disclosure, an automated security control configuration system is used to map abstract input security information to specific configuration instructions that can be used to configure components in different layers of an IT stack. The mapping can be based on searching a knowledge base that correlates different security levels, different industry verticals, different compliance specifications, asset sensitivity classifications, and different technology components (among other information) to respective security configuration instructions that configure security controls of IT components in the IT stack.

The input security information that is used as part of mapping to specific security controls of the components of the IT stack by the security control configuration system is technology and product agnostic. Input security information is technology agnostic if the input security information is not dependent upon the type of technology (e.g., type or version of OS, type or version of firmware, type or version of a hardware component, etc.) of the components of the IT stack. Input security information is product agnostic if the input security information is not dependent upon the brand or model of any component of the IT stack. Rather, the input security information that is technology and product agnostic is specified at an abstract level that is applicable to any of various different types of technologies and products.

An "industry vertical" can refer to a market in which vendors offer goods and/or services specific to an industry, trade, profession, or other group of customers with specified interests. A "compliance specification" can refer to a standard, a regulation, a law, a benchmark, or any other defined set of requirements (whether public or proprietary) relating to how a component or a group of components of an IT stack is to operate. An "asset sensitivity classification" can refer to a classification of an IT component according to sensitivity, such as top secret, secret, non-secret or public, and so forth. "Technology components" can refer to components that may be present in any of the layers of an IT stack.

Figure 1:
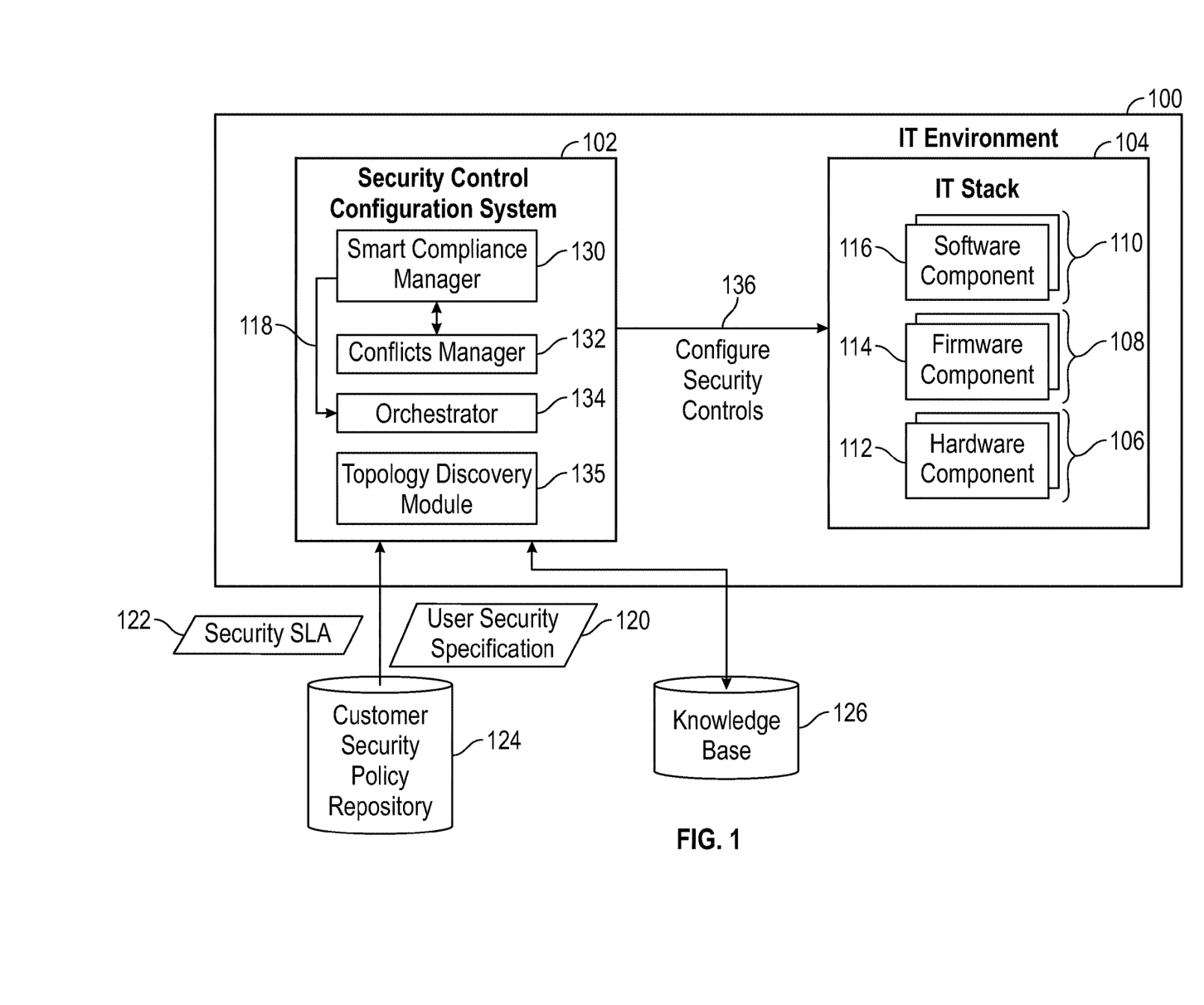
FIG. 1 is a block diagram of an arrangement including an information technology (IT) environment that has a security control configuration system according to some examples.

FIG. 1 is a block diagram of an example arrangement that includes an IT environment 100, such as a data center, a cloud, an enterprise computing environment, and so forth. In examples according to FIG. 1, the IT environment 100 includes a security control configuration system 102. In other examples, the security control configuration system 102 is separate from the IT environment 100, but is in communication with resources of the IT environment, including resources that are part of an IT stack 104 of the IT environment. The security control configuration system 102 can be implemented using a single computer or a collection of computers.

The IT stack 104 includes a hardware layer 106, a firmware layer 108, and a software layer 110. The hardware layer includes hardware components 112, the firmware layer 108 includes firmware components 114, and the software layer 110 includes software components 116.

The security control configuration system 102 is able to derive and orchestrate security controls for the IT stack 104 (for the entire IT stack 104 or for a portion of the IT stack 104).

In examples according to FIG. 1, the security control configuration system 102 includes various blocks, including a smart compliance manager 130, a conflicts manager 132, an orchestrator 134, and a topology discovery module 135. As noted above, in some examples, the security control configuration system 102 can be implemented with a computer or a collection of computers. In such examples, the smart compliance manager 130, the conflicts manager 132, the orchestrator 134, and the topology discovery module 135 can be implemented as machine-readable instructions executed on a computer (or multiple computers) of the security control configuration system 102. In other examples, any or some combination of the smart compliance manager 130, the conflicts manager 132, the orchestrator 134, and the topology discovery module 135 can be implemented using a hardware processing circuit, which can include any or some combination of the following: a microprocessor, a core of a multi-core microprocessor, a microcontroller, a programmable integrated circuit, a programmable gate array, or another hardware processing circuit.

Although shown as four separate blocks, it is noted that the functionalities of the smart compliance manager 130, the conflicts manager 132, the orchestrator 134, and the topology discovery module 135 can be consolidated into fewer blocks or divided into more than four blocks.

Also, any of the smart compliance manager 130, the conflicts manager 132, the orchestrator 134, and the topology discovery module 135 can be external of the security control configuration system 102 in other examples.

The smart compliance manager 130 is able to automatically derive security configuration instructions 118 that configure the security controls of the IT stack 104 based on high-level input information that is technology and product agnostic, including a user security specification 120 and a security service level agreement (SLA) 122, for example. Although the user security specification 120 and the security SLA 122 are each represented in the singular sense, it is noted that the security control configuration system 102 can receive multiple user security specifications 120 (from one user or from multiple users) and/or can receive multiple security SLAs 122.

Once the security configuration instructions 118 have been derived by the smart compliance manager 130, the orchestrator 134 is able to orchestrate the configuration of security controls (136) using the security configuration instructions 118.

As part of deriving the security configuration instructions 118, the smart compliance manager 130 interacts with the conflicts manager 132, which is able to resolve any conflicts that may arise (due to various factors discussed further below) between security controls for a component or group of components of the IT stack.

The user security specification(s) 120 and the security SLA(s) 122 can be retrieved by the security control configuration system 102 from a customer security policy repository 124 (or from multiple customer security policy repositories). A "repository" can refer to a data structure (or multiple data structures) that can be stored in a storage device (or multiple storage devices). The customer security policy repository 124 can store information based on input from designated users, such as system administrators and so forth. As used here, a "storage device" can refer to a volatile memory device, a non-volatile memory device, a disk-based storage device, or any other type of storage device used for storing data.

In other examples, instead of retrieving the user security specification(s) 120 and/or the security SLA(s) 122 from the customer security policy repository(ies) 124, the security control configuration system 102 can receive the user security specification(s) 120 and/or the security SLA(s) 122 from a user device (or multiple user devices), where a user device can include a desktop computer, a notebook computer, a tablet computer, a smart phone, or any other electronic device.

The security control configuration system 102 is also able to access a knowledge base 126, which maps certain information (discussed further below) to respective security configuration instructions for configuring security controls, as discussed further below. A "knowledge base" can refer to a data structure (or multiple data structures) to store information, where the data structure(s) can be stored in a storage device (or multiple storage devices).

The user security specification 120 and the security SLA 122 can be considered as a high-level abstraction of a customer intent that represents a security level (or multiple security levels) for the IT stack 104. A security level represents a security protection to be provided for the IT stack 104 (the entire IT stack 104 or a portion of the IT stack 104). For example, a security level can be indicated using one of multiple discrete levels, such as a low security level, a medium security level, and a high security level. A low security level indicates that security protections provided by the IT stack 104 are less than security protections provided for a medium or high security level. In other examples, a security level can be represented using a numerical value, with different numerical values indicating different levels of security protections offered by the IT stack 104.

As noted above, each security control can be used to manage a security setting of a component or a group of components in the IT stack 104. A user security specification 120 can include information specified by a user (or group of users) relating to a target security protection to be provided by the IT stack 104. For example, the user security specification 120 can specify a value for a security mode, where the value can be a categorical value such as "low," medium," and "high," or alternatively, can be a numerical value. The different values for the security mode correspond to different security levels for the IT stack 104. In other examples, the user security specification 120 can specify a target security mode in a different way, such as by specifying whether or not security protection is to be implemented, and so forth.

A security SLA 122 can refer to an agreement or other type of understanding reached between a customer and a service provider, such as the entity that manages or supports the IT environment 100, relating to a security protection to be offered by the IT stack 104. The security SLA 122 can similarly specify a security mode based on a value assigned to the security mode, or in a different manner.

In further examples, the high-level input information can further include user-specified information for the following: industry vertical, compliance specification, physical security, network security, device commissioning and decommissioning controls, asset sensitivity classification, and so forth.

In additional examples, the high-level input information can include information relating to security detection and recovery, security control audit frequency (how often security of an IT stack is to be audited), data security (e.g., whether data backup is to be performed), use of data ciphers, and so forth.

Examples of the security controls that are configured by the security configuration instructions 118 can include any or some combination of the following, as examples: a login configuration (which specifies whether a login to a specific component or group of components is to be performed before access to the specific component or group of components is allowed), a password configuration (which specifies an aspect of a password (e.g., a length of the password, a mix of characters to use in the password, etc.), to be used before access to the specific component or group of components is allowed), a cipher configuration (which specifies whether a cryptographic process, which may involve data encryption, a digital signature, etc., is to be employed, and if so, the type of cryptographic process to use), a security alert configuration (which specifies whether or not and the type of alert to issue in response to a security event), a peripheral device connection configuration (which specifies whether or not a peripheral connection (e.g., connection of an external Universal Serial Bus (USB) device) to a component or group of components of the IT stack 104 is enabled or disabled), remote console configuration (which specifies whether or not a remote console connection to a component or group of components of the IT stack 104 is allowed, and if so, whether the remote console connection is encrypted or not), and so forth.

For example, for a high security level (which can be indicated by a user security specification 120 and/or a security SLA 122), the security controls configured by the security configuration instructions 118 can specify that a longer password is to be used, an unused port to a peripheral device is to be disabled, a security certificate management process is to be implemented (where access to a component or group of components of the IT stack 104 is controlled based on presentation of a security certificate, which may include a digital signature), a security alert is to be issued for all security events, encryption is to be applied to a remote console session between a remote device and a component of the IT stack 104, and so forth. As another example, for a low security level, the security controls configured by the security configuration instructions 118 can specify that a shorter password is to be used, a port to a peripheral device is to be enabled, a security certificate management process is not implemented, a security alert is to be issued for just a certain subset of security events (e.g., security events indicated as critical or severe), encryption is not to be applied to a remote console session, and so forth.

The topology discovery module 135 is able to perform automated discovery of the components of the IT stack 104, including for example, installed applications and OSs, electronic devices (such as computers, electronic cards, embedded management controllers, storage controllers, routers, switches, trusted platform modules (TPMs), etc.), storage devices, firmware code (e.g., UEFI code, firmware code for hardware components, etc.), and so forth. The topology discovery module 135 is also able to discover the topology of the components of the IT stack 104, where the topology of the components can represent relationships between the components (e.g., which components are connected to other components, which components are controlled by other components, and so forth).

The topology discovery module 135 is able to perform automated discovery of the components of the IT stack 104 based on accessing a resource database (or multiple resource databases) that contain a listing (or listings) of devices and associated program code present in the IT environment 100. Such resource database(s) may be created for the IT environment 100 as IT components are added to the IT environment 100.

The topology discovery module 135 is also able to discover the industry vertical for a component or group of components (e.g., finance for a banking application, etc.) of the IT stack 104, and a compliance specification for a component or group of components of the IT stack 104. As noted above, an industry vertical can refer to a market in which vendors offer goods and/or services specific to an industry, trade, profession, or other group of customers with specified interests. A compliance specification can refer to a standard, a regulation, a law, a benchmark, or any other defined set of requirements (whether public or proprietary) relating to how a component or a group of components of an IT stack is to operate.

Examples of compliance specifications can include any or some combination of the following: Payment Card Industry Data Security Standard (PCI DSS), National Institute of Standards and Technology (NIST) 800-53, General Data Protection Regulation (GPDR), Health Insurance Portability and Accountability Act (HIPAA) standard, and so forth. Although some example compliance specifications are listed, it is noted that other compliance specifications can be used in other examples.

PCI DSS is a set of security standards designed to ensure that entities that accept, process, store, or transmit credit card information maintain a secure environment. NIST 800-53 refers to a collection of security and privacy controls for U.S. federal information systems. GPDR is a regulation based on European Union (EU) law relating to data protection and privacy. HIPAA refers to standards that govern the protection of health data of patients.

The topology discovery module 135 can access database(s) that correlate certain IT components and software inventory to corresponding industry verticals and compliance specifications, to automatically discover the industry verticals, compliance specifications, and asset sensitivity classifications that are applicable for the components of the IT stack 104. Such database(s) may be created for the IT environment 100 based on specific knowledge of administrators, experts, industry information, and so forth.

The knowledge base 126 can map security levels (indicated by abstract input security information such as in the form of the user security specification 120 and/or the security SLA 122), industry verticals, compliance specifications, asset sensitivity classifications, IT components, and other user-input information (such as those listed further above) to corresponding security configuration instructions that configure security controls for respective IT components. Generally, the abstract input security information is translated using the knowledge base 126 to a security baseline in the form of security configuration instructions.

Figure 2:
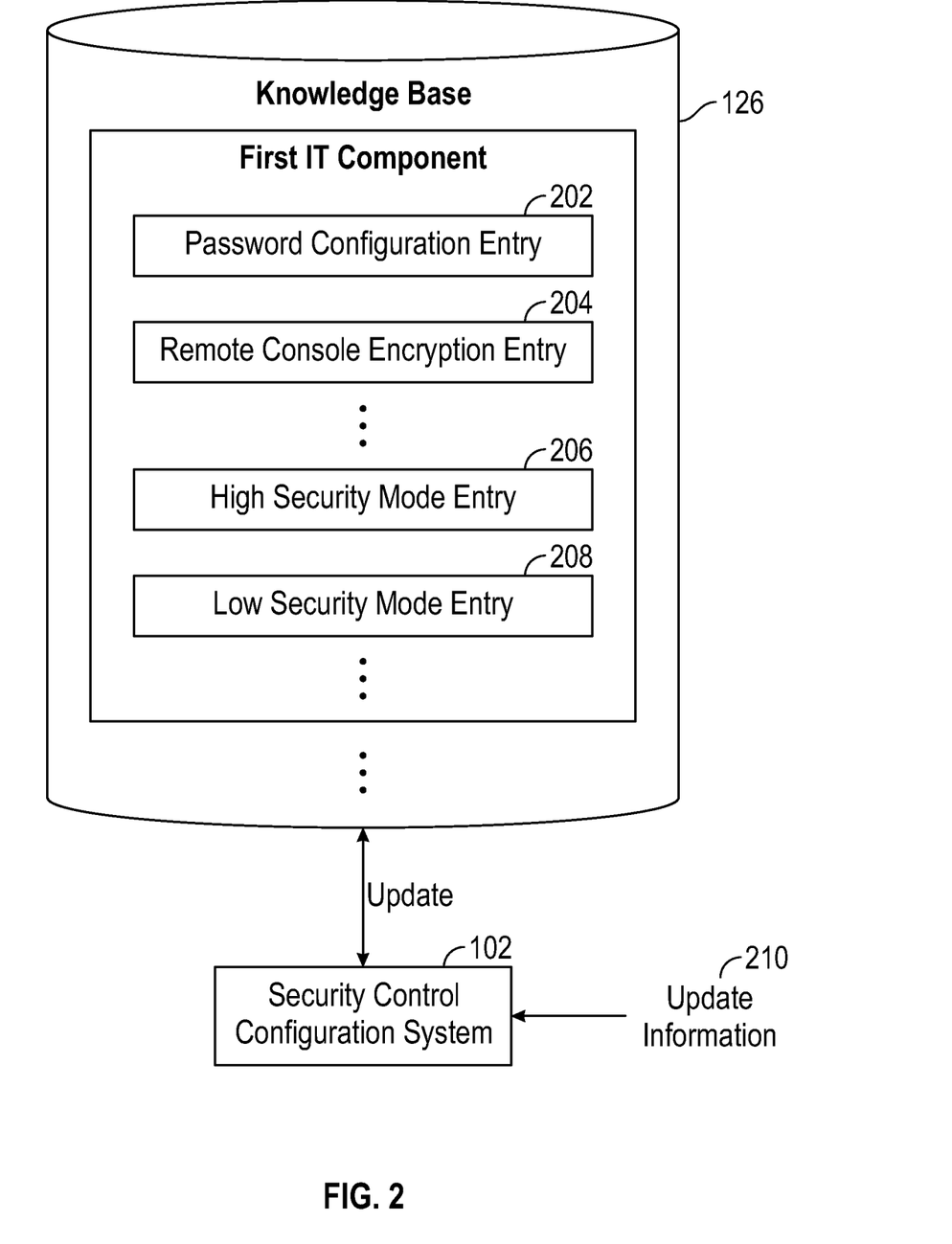
FIG. 2 is a block diagram of a knowledge base and a security control configuration system according to some examples.

In some examples, the entries of the knowledge base 126 can be populated according to Center for Internet Security (CIS) benchmarks, Security Technical Implementation Guide (STiG) standards, domain expertise of humans, and so forth.

For example, for each particular IT component, the knowledge base 126 can include various entries that map industry verticals, compliance specifications, asset sensitivity classifications, and IT components to corresponding security configuration instructions for corresponding security controls. For example, as shown in FIG. 2, for a first IT component, a password configuration entry 202 is for a security control relating to setting a length of a password to be used to access the first IT component. The password configuration entry 202 can map different compliance specifications and sensitivity classifications to different password lengths (e.g., PCI DSS correlates to a first password length, GPDR correlates to a second password length, a top secret classification correlates to one password length, a secret classification correlates to a different password length, a public classification, etc.). The password configuration entry 202 can also specify that the password configuration specified by the password configuration entry 202 is applicable to selected industry verticals (e.g., all industry verticals or some subset of industry verticals). The password configuration entry 202 further includes a security configuration instruction relating to setting a password length. For example, the security configuration instruction in the password configuration entry 202 can be in the form of a Hypertext Transfer Protocol (HTTP) POST request to set a value representing the password length. In other examples, other types of security configuration instructions can be used to set the password length.

For the first IT component, a remote console encryption entry 204 is for a security control relating to encryption used for a remote console session. The remote console encryption entry 204 can map different compliance specifications and asset sensitivity classifications to different encryptions to be used for remote console sessions. The remote console encryption entry 204 can also specify that the remote console encryption configuration specified by the remote console encryption entry 204 is applicable to selected industry verticals (e.g., all industry verticals or some subset of industry verticals). The remote console encryption entry 204 further includes a security configuration instruction relating to setting the specific encryption to be used (if any).

Although not shown, for the first IT component, there can be other entries for other security controls, such as a security alert control, a peripheral port enable/disable control, and so forth.

For the first IT component, the knowledge base 126 further includes a high security mode entry 206, which correlates a high security level to different security control settings, such as a password length, a security alert, a remote console encryption, enabling/disabling a peripheral port, and so forth. Also, for the first IT component, the knowledge base 126 further includes a low security mode entry 208, which correlates a standard security level to different security control settings, such as a password length, a security alert, a remote console encryption, enabling/disabling a peripheral port, and so forth. The knowledge base 126 may include other security mode entries for other security levels for the first IT component.

The knowledge base 126 may include similar entries for other IT components.

The knowledge base 126 contains hierarchical data models relating to security controls of the various components. In the example of FIG. 2, the password configuration entry 202 is a first data model for the password configuration control, the remote console encryption entry is a second data model for the remote console encryption configuration, and so forth. The high security mode entry 206 and the low security mode entry 208 are data models for different security levels. The data models are hierarchical in the sense that an overall data model for the first IT component includes the data models corresponding to the entries 202, 204, 206, and 208, an overall data model for a second IT component includes data models corresponding to similar entries for the second IT component, and so forth.

In some cases, conflicts may arise in security configurations for components of the IT stack 104. For example, for a given IT component, the knowledge base 126 may map abstract input security information to different possible configurations. For example, a high security mode (as specified in the abstract input security information) may map to use of a password length of a first value, while a particular compliance specification (e.g., PCI DSS, DSPR, HIPAA, etc., as specified in the abstract input security information) may specify use of a password length of a different value. When a conflict is detected, the conflicts manager 132 is able to apply a criterion (or multiple criteria) relating to how the conflict should be withdrawn. For example, one criterion involves the conflicts manager 132 selecting a security control with the highest strength, which in the above example is the password length that is longer. In other examples, the conflicts manager 132 can resolve the conflict based on analyzing historical data, seeking a selection by a human user, reviewing information relating to industry best practices, and so forth.

Once the security configuration instructions 118 are derived by the smart compliance manager 130 (following any conflict resolution by the conflicts manager 132), the orchestrator 134 is able to use an interface to provide the security configuration instructions 118 to the components of the IT stack 104. For example, the interface can be in the form of a Representational State Transfer (REST) interface, an application programming interface (API), or any other type of interface that allows communications between the security control configuration system 102 and the IT stack 104.

In some examples, the security control configuration system 102 is able to update the knowledge base 126 in response to update information 210, such as based on updated threat intelligence information (which can identify new threats, such as new viruses, new malware, new ransomware, etc.), an updated vulnerability landscape (relating to updates regarding how IT components are vulnerable to attacks), information relating to new or updated products (new or updated hardware components or new or updated software or firmware components as they are added to the IT environment 100), updated information relating to new or enhanced security features (e.g., newer versions supporting a higher security configuration that may be desirable for the emerging threat landscape), compliance mapping to security control changes (e.g., newer versions of PCI-DSS, HIPPA, etc.), and so forth.

For example, the security control configuration system 102 can update the knowledge base 126 with information pertaining to new/updated products and new/enhanced security features, and can add or update security configuration instructions. For example, in response to detecting new threats, a higher level cipher (e.g., more robust encryption) can be employed, peripheral ports may be disabled, password lengths can be made longer, and so forth.

Based on the updated knowledge base 126, the security control configuration system 102 can determine, fora given IT stack (e.g., 104 in FIG. 1), whether new or updated security controls are to be provided, based on mapping the abstract input security information to corresponding security configuration instructions using the updated knowledge base 126. If the security control configuration system 102 determines that new or updated security controls are to be applied, the security control configuration system 102 can either notify a human administrator or can automatically apply the new or updated security controls.

Figure 3:
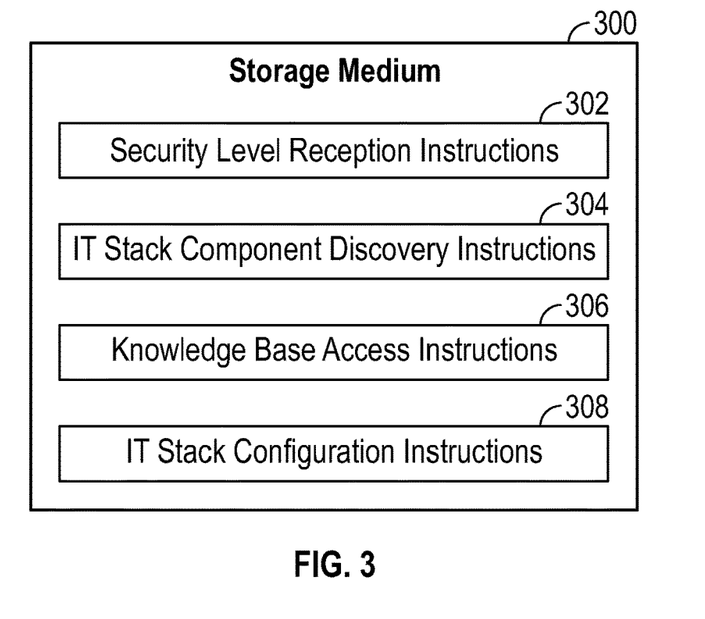
FIG. 3 is a block diagram of a storage medium storing machine-readable instructions according to some examples.

FIG. 3 is a block diagram of a non-transitory or computer-readable machine-readable storage medium 300 storing machine-readable instructions that upon execution cause a system to perform various tasks. The machine-readable instructions include security level reception instructions 302 to receive input information relating to a security level for an IT stack including a plurality of layers including a hardware layer and a software layer, where the input information is technology and product agnostic. The input information can include a user security specification (e.g., 120 in FIG. 1) or a security SLA (e.g., 122 in FIG. 1).

The machine-readable instructions include IT stack component discovery instructions 304 to discover components of the plurality of layers of the IT stack.

The machine-readable instructions include knowledge base access instructions 306 to access a knowledge base that maps the security level and the discovered components (and possibly additional information) to security configuration instructions relating to security controls of components of the IT stack. The security controls are selected from among a login configuration, a password configuration, a cipher configuration, a security alert configuration, a peripheral device connection configuration, or a remote console session encryption configuration. Note that other examples of security controls can be used also.

The machine-readable instructions further include IT stack configuration instructions 308 to configure the IT stack (the entire IT stack or a portion of the IT stack) with the security controls using the configuration instructions.

In further examples, the input information further includes information relating to compliance specifications for the IT stack, and the knowledge base maps the security level, the information relating to the compliance specifications, and the discovered components to the configuration instructions relating to the security controls.

In further examples, the input information further includes information relating to an industry vertical of the IT stack (the entire IT stack or a portion of the IT stack, and the knowledge base maps the security level, the information relating to the industry vertical of the IT stack, and the discovered components to the configuration instructions relating to the security controls.

In further examples, the input information further includes information relating to an asset sensitivity classification of the IT stack, and the knowledge base maps the security level, the information relating to an asset sensitivity classification, and the discovered components to the configuration instructions relating to the security controls.

Figure 4:
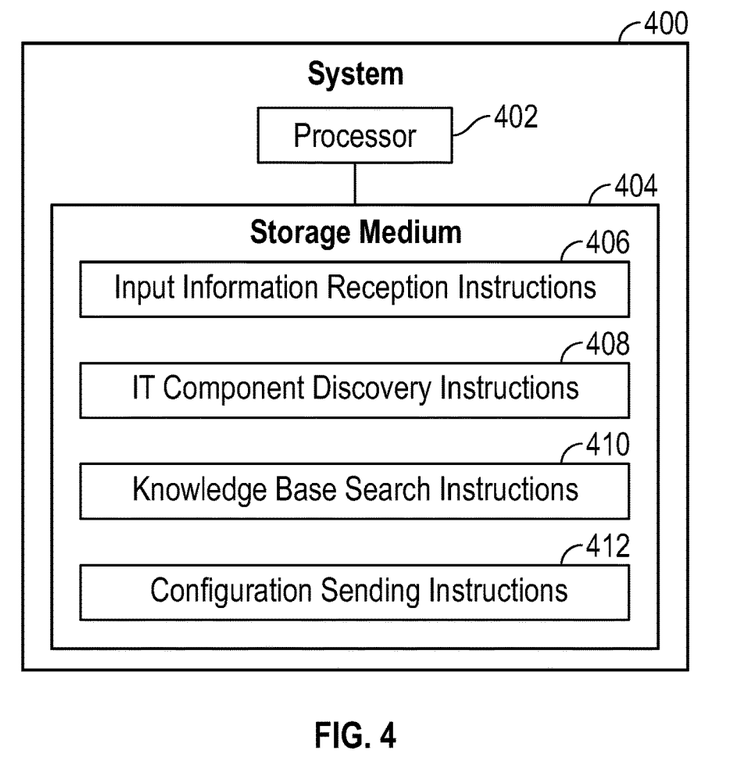
FIG. 4 is a block diagram of a system according to some examples.

In further examples, the knowledge base can be updated in response to information selected from among information pertaining to support of a new or updated product, updated threat intelligence information, an updated vulnerability landscape, an updated security feature enhancement, or an updated compliance specification FIG. 4 is a block diagram of a system 400, which can be implemented using a computer or multiple computers. The system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 includes a storage medium 404 that stores machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include input information reception instructions 406 to receive input information relating to a security level for an IT stack including a plurality of layers including a hardware layer, a firmware layer, and a software layer. The machine-readable instructions include IT component discovery instructions 408 to discover IT components of the plurality of layers of the IT stack.

The machine-readable instructions include knowledge base search instructions 410 to search, based on the input information and the discovered components, a knowledge base that maps different security levels for respective IT components to configuration instructions relating to security controls, where the search provides selected configuration instructions retrieved from the knowledge base.

The machine-readable instructions include configuration sending instructions 412 to send, through an interface, the selected configuration instructions to the components of the IT stack to configure the components of the IT stack with respective security controls corresponding to the selected configuration instructions.

Figure 5:
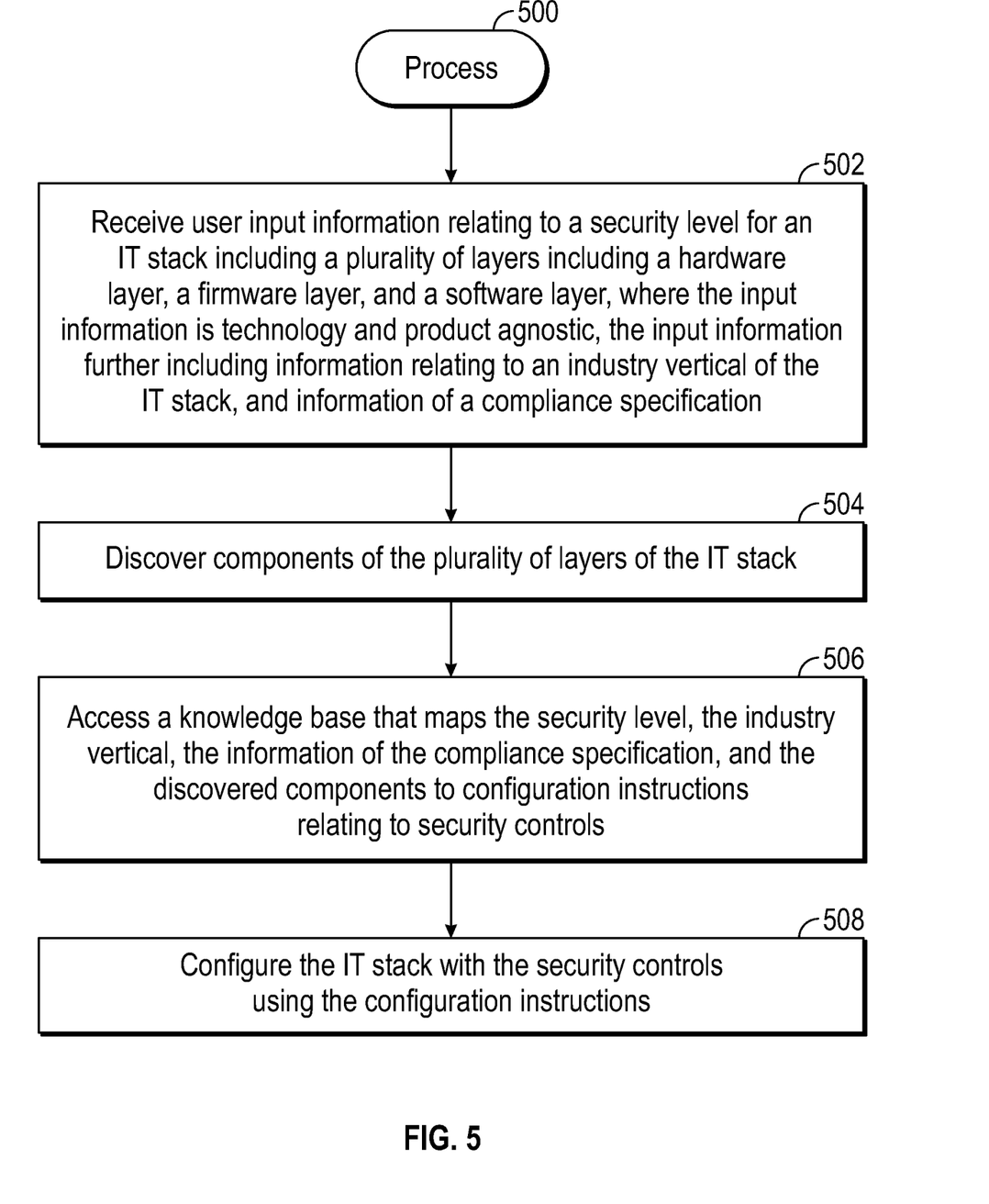
FIG. 5 is a block diagram of a process according to some examples.

FIG. 5 is a flow diagram of a process 500 according to some examples.

The process 500 includes receiving (at 502) user input information relating to a security level for an IT stack including a plurality of layers including a hardware layer, a firmware layer, and a software layer, where the input information is technology and product agnostic, the input information further including information relating to an industry vertical of the IT stack, and information of a compliance specification.

The process 500 includes discovering (at 504) components of the plurality of layers of the IT stack.

The process 500 includes accessing (at 506) a knowledge base that maps the security level, the industry vertical, the information of the compliance specification, and the discovered components to configuration instructions relating to security controls.

The process 500 includes configuring (at 508) the IT stack with the security controls using the configuration instructions.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
receive input information relating to a security level for an information technology (IT) stack comprising a plurality of layers including a hardware layer and a software layer, wherein the input information is technology and product agnostic;
discover components of the plurality of layers of the IT stack;
access a knowledge base that maps the security level and the discovered components to configuration instructions relating to security controls, wherein the knowledge base comprises information pertaining to different types of components, wherein the information pertaining to the different types of components comprises configuration instructions relating to security controls for the different types of components, and wherein the components of the plurality of layers of the IT stack are a subset of the different types of components; and
configure the IT stack with the security controls using the configuration instructions, the configuring of the IT stack comprising sending the configuration instructions to the components of the IT stack.

2. The non-transitory machine-readable storage medium of claim 1, wherein the input information comprises a user security specification that includes information of the security level.

3. The non-transitory machine-readable storage medium of claim 1, wherein the input information comprises a security service level agreement (SLA) that includes information of the security level.

4. The non-transitory machine-readable storage medium of claim 1, wherein the components of the plurality of layers of the IT stack comprise a hardware component, and the configuring of the IT stack comprises configuring the hardware component based on a configuration instruction of the configuration instructions.

5. The non-transitory machine-readable storage medium of claim 1, wherein the security controls comprise a security setting relating to disabling a port of a peripheral device.

6. The non-transitory machine-readable storage medium of claim 1, wherein the plurality of layers of the IT stack further comprise a firmware layer, and wherein the components comprise a firmware component of the firmware layer, and the configuring of the IT stack comprises configuring the firmware component based on a configuration instruction of the configuration instructions.

7. The non-transitory machine-readable storage medium of claim 1, wherein the input information comprises information relating to compliance specifications for the IT stack, and wherein the knowledge base maps the security level, the information relating to the compliance specifications, and the discovered components to the configuration instructions relating to the security controls.

8. The non-transitory machine-readable storage medium of claim 1, wherein the input information comprises information relating to an industry vertical of the IT stack, and wherein the knowledge base maps the security level, the information relating to the industry vertical of the IT stack, and the discovered components to the configuration instructions relating to the security controls.

9. The non-transitory machine-readable storage medium of claim 1, wherein the input information comprises information relating to an asset sensitivity classification of the IT stack, and wherein the knowledge base maps the security level, the information relating to the asset sensitivity classification, and the discovered components to the configuration instructions relating to the security controls.

10. The non-transitory machine-readable storage medium of claim 1, wherein the configuration instructions are to be sent through an interface to the components of the plurality of layers of the IT stack.

11. The non-transitory machine-readable storage medium of claim 1, wherein the instructions upon execution cause the system to:
update the knowledge base in response to information selected from among:
information pertaining to support of a new or updated product,
updated threat intelligence information, or
an updated vulnerability landscape.

12. A system comprising:
a processor; and
a non-transitory storage medium storing instructions executable on the processor to:
receive input information relating to a security level for an information technology (IT) stack comprising a plurality of layers including a hardware layer and a software layer, wherein the input information is technology and product agnostic, and wherein the input information comprises information relating to a compliance specification;
discover IT components of the plurality of layers of the IT stack;
search, based on the input information and the discovered IT components, a knowledge base that maps different security levels for respective IT components to configuration instructions relating to security controls, wherein the search provides selected configuration instructions retrieved from the knowledge base, and wherein the knowledge base further maps different compliance specifications for the respective IT components to the configuration instructions relating to the security controls; and
send, through an interface, the selected configuration instructions to the IT components of the IT stack to configure the IT components of the IT stack with respective security controls corresponding to the selected configuration instructions.

13. The system of claim 12, wherein the selected configuration instructions are sent through the interface to a hardware component and a software component of the IT stack.

14. The system of claim 13, wherein the IT stack further comprises a firmware layer, and wherein the selected configuration instructions are further sent through the interface to a firmware component of the firmware layer.

15. A method performed by a system comprising a hardware processor, comprising:
receiving user input information relating to a security level for an information technology (IT) stack comprising a plurality of layers including a hardware layer, a firmware layer, and a software layer, wherein the user input information is technology and product agnostic, the user input information further comprising information of a compliance specification;
discovering components of the plurality of layers of the IT stack;
accessing a knowledge base that maps the security level, the information of the compliance specification, and the discovered components to configuration instructions relating to security controls, wherein the security level is mapped by the knowledge base to a first security control that conflicts with a second security control mapped by the knowledge base to the compliance specification;
resolve the conflict between the first security control and the second security control according to a criterion, wherein the resolving of the conflict produces a resulting security control; and
configuring the IT stack with the resulting security control using the configuration instructions.

16. The method of claim 15, wherein the resolving of the conflict is based on analyzing historical data.

17. A non-transitory machine-readable storage medium comprising instructions that upon execution cause a system to:
receive input information relating to a security level for an information technology (IT) stack comprising a plurality of layers including a hardware layer and a software layer, wherein the input information is technology and product agnostic;
discover components of the plurality of layers of the IT stack;
access a knowledge base that maps the security level and the discovered components to configuration instructions relating to security controls;
identify a conflict between a first security control for a first component of the components of the plurality of layers of the IT stack mapped by the knowledge base to the security level, and a second security control for the first component mapped by the knowledge base to a compliance specification; and
resolve the conflict between the first security control and the second security control based on a criterion, wherein the resolving of the conflict produces a resulting security control that is used to configure the IT stack; and
configure the IT stack with the security controls using the configuration instructions, the configuring of the IT stack comprising sending the configuration instructions to the components of the IT stack.

18. A system comprising:
a processor; and
a non-transitory storage medium storing instructions executable on the processor to:
receive input information relating to a security level for an information technology (IT) stack comprising a plurality of layers including a hardware layer and a software layer, wherein the input information is technology and product agnostic, and wherein the input information comprises information relating to an industry vertical of the IT stack;
discover IT components of the plurality of layers of the IT stack;
search, based on the input information and the discovered IT components, a knowledge base that maps different security levels for respective IT components to configuration instructions relating to security controls, wherein the search provides selected configuration instructions retrieved from the knowledge base, and wherein the knowledge base further maps different industry verticals for the respective IT components to the configuration instructions relating to the security controls; and send, through an interface, the selected configuration instructions to the IT components of the IT stack to configure the IT components of the IT stack with respective security controls corresponding to the selected configuration instructions.

\* \* \* \* \*